United States Patent Office 3,267,001
Patented August 16, 1966

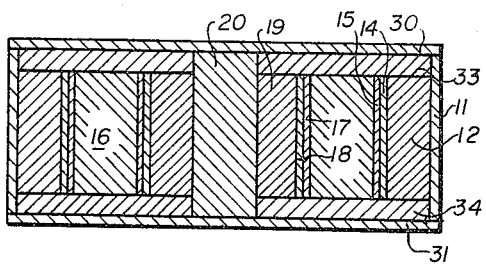
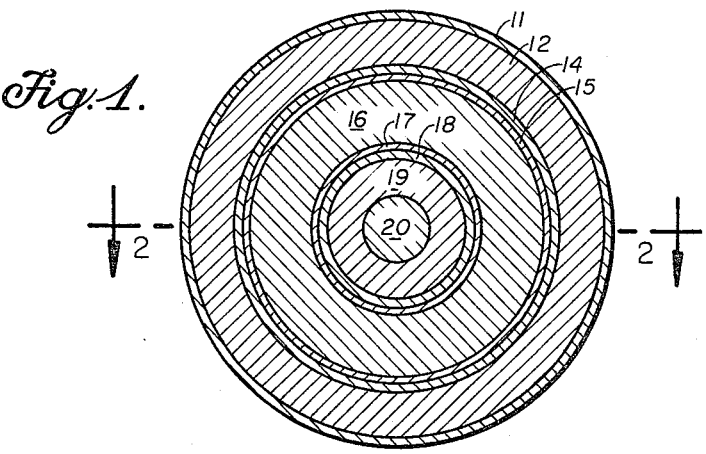
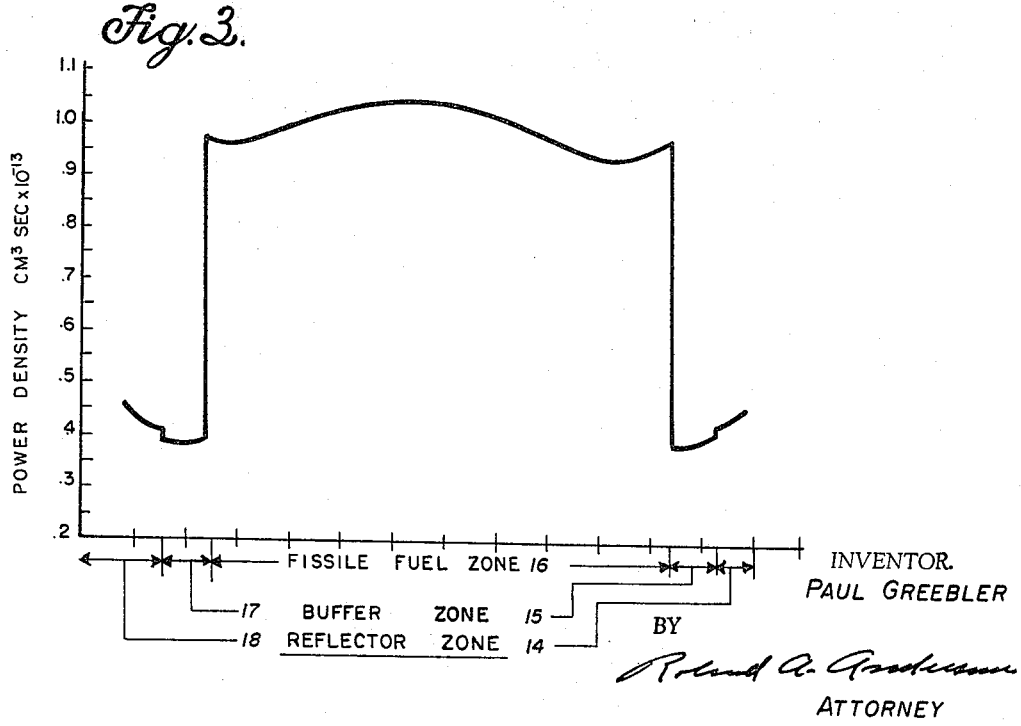

3,267,001
MODERATOR REFLECTOR FAST NEUTRON REACTOR CORE
Paul Greebler, San Jose, Calif., assignor to the United States of America as represented by the United States Atomic Energy Commission
Filed Oct. 12, 1965, Ser. No. 495,356
14 Claims. (Cl. 176—17)

The invention described herein was made in the course of, or under, Contract No. AT(04–3)–189, Project Agreement No. 10, with the United States Atomic Energy Commission.

This invention relates to nuclear reactors and in particular to the core of a nuclear reactor in which high energy "fast" neutrons are the primary means for achieving a sustained fission reaction.

In nuclear reactors current in the art, the fissile fuel containing core is generally of a cylindrical configuration comprised of a mass of fissile fuel interspersed with neutron moderating material and having neutron absorbing control rods arranged through the fissile fuel mass. In the case of nuclear reactors having high neutron leakage and utilizing fast or high energy neutrons to achieve a sustained fission reaction, movable neutron reflectors have been used which achieve reactivity control through regulation of the leakage of neutrons from the core. To gain a further economic advantage, nuclear reactors utilizing fast neutrons generally employ a layer or "blanket" of fertile material such as uranium-238 or thorium-232 on the top and bottom of the core to produce or "breed" new fissile fuel, plutonium-239 or uranium-233, respectively through neutron capture.

As the physical size of the fast nuclear reactor core is increased in order to achieve a greater power from a single reactor, problems emerge with regards to control of reactivity, power distribution through the core, neutron economy with relation to breeding new fuel, and changes in reactivity due to coolant voidage. The prior art techniques employed to overcome these problems have generally been to truncate the core to achieve a cylindriform configuration wherein the height of the cylinder is somewhat less than its diameter. Reflector or preferably fertile materials are then placed as blankets on the top and bottom of this configuration and control is achieved through neutron absorbing rods interspersed in the core. (For large reactors of this configuration, the radius is too large and, hence, the radial leakage too small to get enough control with movable reflector segments placed adjacent to the outer radius of the core.) This configuration tends to have a high power density near the center and a low power density at the periphery of such a core. Since there would be a high neutron flux at the center which was being moderated partially by the liquid coolant, e.g., sodium, any voiding (boiling) of the coolant would result in an increase in the number of unmoderated fast neutrons leading to a high probability of an excess reactivity excursion condition. In contrast, coolant voiding at the periphery of the core would connote a higher neutron leakage which would result in a lowering rather than an increase in reactivity in the core.

In an attempt to flatten, i.e., create an even power distribution across the reactor core. The prior art methods have arranged fuel elements within the core such that the enrichment of the fuel, i.e., the percentage of fissionable isotope uranium-235 or plutonium-239, decreases progressing toward the center of the core. This method raises the further problem of increasing the number of fuel elements having especially tailored fissile fuel loadings and the resulting special handling problems in managing the fuel to achieve high burn-up.

The present invention arranges the neutron reflector material, fissile fuel material, and breeder blanket material into specific zones to take advantage of the properties of the material and provide an even, i.e., flat power distribution across the fissile fuel portion of the core, so as to reduce the positive reactivity effect associated with coolant voidage and achieve greater economy in the use of excess neutrons to react with fertile material to breed new fuel.

It is, therefore, an object of this invention to provide a core for a fast neutron reactor.

It is another object of this invention to provide a core for a fast neutron reactor having uniform power distribution throughout the fissile fuel portion of the core.

It is a further object of this invention to provide a core for a fast neutron reactor having an improved safety feature of reduced coolant voidage probability.

It is a still further object of this invention to provide greater neutron economy in the breeding of new fuel in the core of a fast neutron reactor.

Other and more particular objects of this invention will be manifest upon study of the following detailed description when taken together with the accompanying drawing, in which:

FIGURE 1 is a transverse section through a core in accord with the invention showing the annular cylindriform zones of reflector, breeder, buffer and fissile materials;

FIGURE 2 is a longitudinal section, taken at lines 2—2, through the center of the core showing the blankets of material on the top and bottom of the core; and FIGURE 3 is a graph of the power distribution across the fissile fuel zone of the core of this invention.

Briefly, referring to FIGURE 1, the reactor core of this invention comprises neutron reflector material, fissile fuel material, buffer material and breeder blanket material arranged in mutually concentric annular cylindriform configurations defining a series of mutually concentric annular cylindriform zones concentric with a central cylindriform neutron reflector. These materials are distributed, respectively, beginning with an outermost zone and progressing radially inwardly, in an outermost first neutron reflector. Zone 11, a first breeder blanket zone 12, a second neutron reflector zone 14, a first buffer zone 15, a fissile fuel zone 16, a second buffer zone 17, a third neutron reflector zone 18, and a second breeder blanket zone 19, said second breeder blanket zone 19 concentrically circumjacent a central cylindrical neutron reflector zone 20.

Referring to FIGURE 2, a discoidal top breeder blanket 30 and a discoidal bottom breeder blanket 31 are provided to utilize neutrons axially emitted from the core for breeding new fissile fuel. Top neutron reflector 33 and bottom neutron reflector 34 are disposed between blankets 30 and 31, respectively, and the core to aid to reflect some of the neutrons axially emitted by the fissile fuel back into the core.

Such a reactor core can be utilized in various reactors, for example, the nuclear reactor disclosed in detail in USAEC Research and Development Report GEAP–4418 Liquid Metal Fast Breeder Reactor Design Study (1000 MWe $UO_2$-$PuO_2$ Fueled Plant), volume 1.

Coolant channels, not shown, may be provided axially through the core, especially in the fissile fuel zone. Coolant material may include steam, helium, carbon dioxide, sodium, sodium-potassium, mercury or the like. For the preferred embodiment, sodium is used as the coolant since it also acts to a degree as a neutron moderating and reflecting material for fast neutrons.

The supporting structure within the core for holding the various breeder, fissile fuel and neutron reflector materials may be in accordance with conventional means, i.e., tubes filled with the variously enumerated materials or elements clad or otherwise constructed in accord with conventional nuclear reactor practice arranged in geometric array parallel to the longitudinal axis of the cylindriform core to provide the above-designed zones. Top and bottom breeder blankets 30 and 31 and top and bottom reflectors 33 and 34 may be arranged as sections proximate the ends of the tubes in accordance with standard reactor practice. For a sodium cooled reactor, the preferred structural material is stainless steel since this material not only withstands the environment of liquid sodium but also acts, in part, as a neutron moderating and reflecting material for fast neutrons even effective in the present method of operation although parasitically absorbing a portion of the "slow" or moderated neutrons.

Neutron reflector material may include beryllium oxide, carbon, zirconium hydride, aluminum oxide, magnesium oxide, nickel or stainless steel. For the preferred embodiment, the reflector material for neutron reflector zones 14 and 18 is beryllium oxide. Neutron reflector zones 11 and 20 may comprise any neutron reflector material, the preferred embodiment utilizing sodium and stainless steel as neutron reflectors in a volume amount approximately 90 volume percent stainless steel and 10 volume percent sodium.

Fissile fuel material in zone 16 may include uranium enriched in the isotope uranium-235, plutonium-239 or plutonium-241 or uranium-233 or mixtures thereof. In the preferred embodiment, the fissile fuel material is a mixture of $UO_2$ and $PuO_2$ enriched in the fissionable isotopes U-235, Pu-239 and Pu-241 in clad element or compact form. Sufficient moderator material, e.g., BeO, carbon, etc., may be added with the fissile fuel in this zone to modify, e.g., degrade, the neutron energy spectrum sufficiently to provide inherent reactivity control in accordance with the method described in copending U.S. patent application Serial Number 345,056, filed February 14, 1964. In the preferred embodiment the sodium coolant and stainless steel in the amounts below noted will degrade the spectrum sufficiently to give the desired effect. Fissile fuel zone 16, in the preferred embodiment includes approximately 33 volume percent $UO_2$–$PuO_2$, 50 volume percent sodium and 17 volume percent stainless steel.

The breeder blanket material in zones 12 and 19 and top and bottom blankets 30 and 31 may include either or both uranium-238 and thorium-232. In the preferred embodiment, the breeder blanket material includes approximately 50 volume percent $UO_2$, 30 volume percent sodium and 20 volume percent stainless steel with the latter two materials arranged as a coolant system for the blanket zone.

Of special importance are buffer zones 15 and 17. These zones are provided at the inner and outer periphery of fissile fuel zone 16 to prevent power peaking at the edge of the fuel zone. The material of the buffer zone may be the same as that of the breeder blanket zones and acts to absorb part of the neutrons emitted from the fissile fuel zone and prevent reflection of an excess of neutrons in a manner to return to the fuel zone and react with the fissile material.

The thickness of the buffer zones is dependent, in part, upon the enrichment, i.e., concentration of fissionable isotope in fissile fuel zone 16, the ability of this material in buffer zones 15 and 17 to reflect neutrons, and the type and amount of neutron moderating material in fissile fuel zone 16. By performing calculations using multi-group equations, as described more completely in "Nuclear Reactor Engineering" by Samuel Glasstone and Alexander Sesonske, published by the Van Nostrand Company, Inc., Princeton, N.J., the thickness of the buffer zone may be determined by iteration until the shape of the power distribution curve radially across fissile fuel zone 16 and buffer zones 15 and 17 approach that of FIGURE 3. FIGURE 3 illustrates the flatness, or uniformity of power distribution radially across fissile fuel zone 16, and is the curve for the ideal core of the preefrred embodiment. For an ideal reduction in power peaking at the inside and outside edge of zone 16, a buffer zone 17 thickness of 2 inches and a buffer zone 15 thickness of 3 inches has been found to produce the effect illustrated by the curve of FIGURE 3.

TABLE I

| Zone | Thickness (inches) | Outside Diameter (inches) |
|---|---|---|
| Outer first neutron reflector 11 | 6 | 184 |
| First breeder blanket 12 | 12 | 172 |
| Second neutron reflector 14 | 4 | 148 |
| First buffer 15 | 2 | 140 |
| Fissile fuel 16 | 18 | 136 |
| Second buffer 17 | 3 | 100 |
| Third neutron reflector 18 | 4 | 94 |
| Second breeder blanket 19 | 12 | 86 |
| Central neutron reflector 20 | 62 | 62 |
| Top breeder blanket 30 | 12 | 172 |
| Bottom breeder blanket 31 | 12 | 172 |
| Top neutron reflector 33 | 6 | 184 |
| Bottom neutron reflector 34 | 6 | 184 |
| Overall height of core | 90 | |
| Axial height of annular zones | 54 | |

TABLE II

*Physics parameters of moderator-reflected (BeO) annular core comparison with pancake*

| | Annular Core | Moderator-Reflected Pancake Core (See 1000 MW e) |
|---|---|---|
| Dimensions and Composition: | | |
| Core thin dimension (length or thickness), ft | 1.5 | 2.0 |
| Core thick dimension (diameter or length), ft | 3.5 | 11.6 |
| Blanket thickness,[a] ft | 1.5 | 1.5 |
| Volumetric Compositions: [b] | | |
| Core (v/o $PuO_2$; steel; sodium; BeO) | (33; 17; 50; 0) | (25; 19; 47; 9) |
| Axial blankets (v/o $UO_2$; steel; sodium; BeO) | (33; 17; 50; 0) | (25; 19; 47; 9) |
| Radial blankets (v/o $UO_2$; steel; sodium) | (50; 20; 30; 0) | (50; 18; 32; 0) |
| Physics Parameters: [c] | | |
| "Enrichment"—a/o Pu (239+241) in core fuel [d] | 16.2 | 16.2 |
| Total breeding ratio | 1.34 | 1.11 |
| Core conversion ratio | 0.55 | 0.65 |
| Doppler coefficient ($T^{dk}/dt$) | [e]−.006 | −.0083 |
| Doppler coefficient with sodium removed | [e]−.004 | −.0066 |
| Δk for total sodium loss from core (not blanket) | +.001 | +.008 |
| Δk for worst partial sodium loss | +.007 | +.012 |
| Radial peak-to-average power density | 1.05 | 1.24 |
| Axial peak-to-average power density | 1.24 | 1.14 |
| Percent of power in blankets | 18 | 12 |
| Power rating of core and blankets (MW(t) [d] | 2,800 | 2,500 |

[a] In addition to buffer blankets of the moderator-reflected case. Buffers have same composition as radial blanket.
[b] Material densities in gm./cm.³ used for these calculations are as follows: fuel 9.3, steel 7.7, sodium 0.83, and BeO 2.36.
[c] Computed for the average fuel in the core at 50,000 MWD/t. burnup. (Corresponds to 100,000 MWD/t. burnup for discharged fuel.)
[d] The three reactors have the same core fuel volume.
[e] Buffers contribute one-fourth of this value, based on very crude Doppler calculations for the buffer regions.

The control of reactivity within the core of this invention may be achieved either by use of neutrons absorbing control rods, common in the art, dispersed throughout the fissile fuel zone 16 or neutron reflectors arranged to control leakage of neutrons out of fissile fuel zone 16 by intercepting those neutrons and reflecting them back into zone 16 to react with the fissile fuel therein.

Since neutron economy is appreciably reduced by the use of neutron absorbing control rods, the preferred means of control is through the use of neutron reflectors. In the present core configuration, the preferred method is to arrange the neutron reflecting material in neutron reflector zones 14 and 18 in convenient segments which may be incrementally moved axially in and out the core as by conventional neutron reactor reflector control mechanism (not shown). Thus, those neutrons emitted through fission of fissile fuel in fissile fuel zone 16 and having passed through buffer zones 15 and 17 will not be reflected upon removal of neutron reflector material from neutron reflector zones 14 and 18. But rather these neutrons will pass into, and become absorbed by, the material in breeder blanket zones 12 and 19 to react with the fertile material therein to create fissionable fuel. A small portion of neutrons, of course, will not be absorbed in blankets 12 and 19 and thus pass on through. To prevent the loss of these neutrons and further increase neutron economy, neutron reflector zones 11 and 20 will be effective to reflect a majority of that small portion back into blankets 12 and 19 affording effective use of these neutrons to breed new fuel. Top and bottom reflector zones 33 and 34 act to accomplish the same end, to retain a large portion of the neutrons which happen to pass through top and bottom breeder blanket zones 30 and 31 without being absorbed, and return these neutrons into zones 30 and 31 for greater neutron utilization in breeding new fuel.

Similarly operating on the same principle in which neutrons enter into and are absorbed by the fertile material in breeder blanket zones 12 and 19 there is a tendency for reactivity to decrease upon voidage, i.e., boiling or loss of the liquid sodium coolant. Since the sodium moderates fast neutrons to some degree, the sodium near the edge of fissile fuel zone 16 will tend to reflect neutrons back into the fissile material to react with the fissile fuel. When there is a void in the sodium upon boiling or a loss of the sodium from the core, a greater number of neutrons will escape and be absorbed into the material of breeder blanket zones 12 and 17 thus removing them from the fission reaction in turn resulting in a reduction in reactivity.

Table I illustrates the dimensions of a typical core of this invention.

Table II illustrates comparison data between the reactor core of this invention and a conventional "pancake" core.

From Table II, the advantages of the core configuration of the present invention can be seen when compared with a conventional core having the same volume of fissile fuel. The change in reactivity in the core of the present invention is substantially less for a loss of sodium condition than the change for a similar condition in the conventional "pancake" core. Thus the danger of an excursion, i.e., dangerous increase in reactivity, from a loss of coolant accident is substantially reduced. Also of particular note is the fact that the power rating of the core of the present invention is higher than that of the conventional core for equal volumes of fuel. In addition, the percentage of power absorbed in the breeder blanket zones of the present invention is greater than that of the conventional core leading to greater neutron economy and, as noted in the table, a higher total breeding ratio.

Although the foregoing embodiment has been described in detail, there are obviously many other embodiments and variations in configuration which may be made by a person skilled in the art without departing from the spirit, scope or principle of this invention. Therefore, this invention is not to be limited except in accordance with the scope of the appended claims.

What is claimed is:
1. In a nuclear reactor core having channels for the passage of coolant therethrough and mechanical reactivity control means therefor, the combination comprising neutron reflector material arranged in a cylindriform configuration defining a central neutron reflector zone, and neutron reflector material, fissile fuel material, buffer material and breeder blanket material arranged in mutually concentric annular cylindriform configurations defining a series of mutually concentric annular cylindriform zones concentric with said central neutron reflector zone with the aforesaid materials distributed, respectively, beginning with the outermost zone and progressing radially inwardly, as an outer first neutron reflector zone, a first breeder blanket zone, a second neutron reflector zone, a first buffer zone, a fissile fuel zone, a second buffer zone, a third neutron reflector zone and a second breeder blanket zone, said second breeder blanket zone concentrically circumjacent said central neutron reflector zone.

2. The apparatus as defined in claim 1 wherein said neutron reflector material is selected from the group consisting of carbon, beryllium oxide, zirconium hydride, aluminum oxide, MgO, nickel and stainless steel.

3. The apparatus as defined in claim 1 wherein said fissile fuel material is selected from the group uranium–233, uranium–235, plutonium–239, and mixtures thereof.

4. The apparatus as defined in claim 1 wherein said fissile fuel material is a mixture of $UO_2$ enriched in the isotope uranium–235 and $PuO_2$.

5. The apparatus as defined in claim 1 wherein said buffer material is $UO_2$ enriched in the isotope uranium–238.

6. The apparatus as defined in claim 1 wherein said buffer material is selected from the group consisting of uranium–238, thorium–232 and mixtures thereof.

7. The apparatus as defined in claim 1 wherein said breeder blanket material is $UO_2$ comprising the isotope uranium–238.

8. The apparatus as defined in claim 1 wherein said breeder blanket material is selected from the group consisting of uranium–238 and thorium–232.

9. In a nuclear reactor core having channels for the passage of coolant therethrough and mechanical reactivity control means therefor, the combination comprising neutron reflector material arranged in a cylindriform configuration defining a central neutron reflector zone, and reflector material, fissile fuel material, buffer material and breeder blanket material arranged in mutually concentric annular cylindriform configurations defining a series of mutually concentric annular cylindriform zones concentric with said central neutron reflector zone with the aforesaid materials distributed, respectively, beginning with the outermost zone and progressing radially inwardly, as an outer first neutron reflector zone, a first breeder blanket zone, a second neutron reflector zone, a first buffer zone, a fissile fuel zone, a second buffer zone, a third neutron reflector zone, a second breeder blanket zone, said second breeder blanket zone circumjacent said central neutron reflector zone, and neutron reflector material arranged in flat disc configurations juxtaposed the ends of said zones, defining, respectively, top and bottom neutron reflector zones of a diameter equivalent to the diameter of said outer first neutron reflector zone.

10. The apparatus as defined in claim 9 wherein said neutron reflector material consists of from 5 to 10 volume percent sodium and the remainder stainless steel.

11. The apparatus as defined in claim 9 wherein said fissile fuel material consists of from 30 to 35 volume percent $UO_2$-$PuO_2$, 45–55 volume percent sodium and the remainder stainless steel.

12. The apparatus as defined in claim 9 wherein said buffer material consists of 45–55 volume percent $UO_2$, 25–35 volume percent sodium and the remainder stainless steel.

13. The apparatus as defined in claim 9 wherein said breeder blanket material is 45–55 volume percent $UO_2$, 25–35 volume percent sodium and the remainder stainless steel.

14. The apparatus as defined in claim 9 wherein the reflector material in second and third neutron reflector zones consists to 80 to 100 volume percent beryllium oxide and the reflector material in said first and central reflector zones consists of 5–15 volume percent sodium and the remainder stainless steel.

References Cited by the Examiner

UNITED STATES PATENTS

| | | | |
|---|---|---|---|
| 2,982,709 | 5/1961 | Miles | 176—17 |
| 3,093,563 | 6/1963 | Menke | 176—17 |
| 3,140,234 | 7/1964 | Loewenstein | 176—17 |
| 3,140,237 | 7/1964 | Peterson et al. | 176—17 |

RUEBEN EPSTEIN, *Primary Examiner.*